US009605595B2

(12) United States Patent
Djelassi

(10) Patent No.: US 9,605,595 B2
(45) Date of Patent: Mar. 28, 2017

(54) METHOD FOR THE ELIMINATION OF ROTATIONAL STALL IN A TURBINE ENGINE

(75) Inventor: Cédrik Djelassi, Marolles en Hurepoix (FR)

(73) Assignee: SNECMA, Paris (FR)

( * ) Notice: Subject to any disclaimer, the term of this patent is extended or adjusted under 35 U.S.C. 154(b) by 430 days.

(21) Appl. No.: 14/002,543

(22) PCT Filed: Feb. 28, 2012

(86) PCT No.: PCT/FR2012/050412
§ 371 (c)(1),
(2), (4) Date: Nov. 8, 2013

(87) PCT Pub. No.: WO2012/120220
PCT Pub. Date: Sep. 13, 2012

(65) Prior Publication Data
US 2014/0075952 A1  Mar. 20, 2014

(30) Foreign Application Priority Data

Mar. 4, 2011  (FR) ..................... 11 51778

(51) Int. Cl.
*F02C 7/26* (2006.01)
*F02C 9/52* (2006.01)
(Continued)

(52) U.S. Cl.
CPC .............. *F02C 7/26* (2013.01); *F02C 9/28* (2013.01); *F02C 9/32* (2013.01); *F02C 9/52* (2013.01);
(Continued)

(58) Field of Classification Search
CPC ...... F02C 7/26; F02C 9/28; F02C 9/32; F02C 9/26; F02C 9/52; F02C 9/54;
(Continued)

(56) References Cited

U.S. PATENT DOCUMENTS

| 3,867,717 | A | 2/1975 | Moehring et al. |
| 3,868,625 | A | 2/1975 | Speigner et al. |

(Continued)

FOREIGN PATENT DOCUMENTS

| EP | 0 418 189 | 2/1994 |
| FR | 2 962 500 | 1/2012 |
| GB | 2 122 398 | 1/1984 |

OTHER PUBLICATIONS

Gu, G., et al., "An Overview of Rotating Stall and Surge Control for Axial Flow Compressors," IEEE Transactions on Control Systems Technology, vol. 7, No. 6, Nov. 1999, pp. 639-647.

(Continued)

*Primary Examiner* — Steven Sutherland
(74) *Attorney, Agent, or Firm* — Pillsbury Winthrop Shaw Pittman LLP

(57) ABSTRACT

A method for eliminating rotational stall in a compressor of a turbine engine, includes automatically detecting surge in the turbine engine; automatically shutting-down the turbine engine; in the event surge is detected, automatically restoring a surge margin; and automatically re-igniting the turbine machine.

9 Claims, 2 Drawing Sheets

(51) Int. Cl.
*F02C 9/32* (2006.01)
*F02C 9/54* (2006.01)
*F02C 9/28* (2006.01)

(52) U.S. Cl.
CPC ............ *F02C 9/54* (2013.01); *F05D 2230/72* (2013.01); *F05D 2260/80* (2013.01); *F05D 2270/092* (2013.01); *F05D 2270/101* (2013.01)

(58) Field of Classification Search
CPC .......... F05D 2260/80; F05D 2270/092; F05D 2270/10; F05D 2270/101–2270/1024; F01D 19/00; F01D 21/00; F01D 21/14
USPC ...... 60/773, 778, 779, 39.091; 415/1, 13–50
See application file for complete search history.

(56) References Cited

U.S. PATENT DOCUMENTS

| | | | |
|---|---|---|---|
| 4,118,926 A | 10/1978 | Curvino et al. | |
| 4,470,118 A * | 9/1984 | Morrison | F02C 9/28 60/39.281 |
| 4,622,808 A * | 11/1986 | Kenison | G01P 5/00 415/27 |
| 5,012,637 A * | 5/1991 | Dubin | F04D 27/001 60/39.24 |
| 5,732,546 A * | 3/1998 | Pineo | F02C 9/28 60/39.281 |
| 5,782,603 A | 7/1998 | O'Brien et al. | |
| 6,364,602 B1 * | 4/2002 | Andrew | F01D 21/10 415/1 |
| 6,871,487 B2 | 3/2005 | Kurtz et al. | |
| 2009/0198432 A1 * | 8/2009 | Tabata | F02D 41/0007 701/103 |

OTHER PUBLICATIONS

International Search Report as issued for PCT/FR2012/050412.

* cited by examiner

METHOD FOR THE ELIMINATION OF ROTATIONAL STALL IN A TURBINE ENGINE

CROSS-REFERENCE TO RELATED APPLICATIONS

This is the U.S. National Stage of PCT/FR2012/050412, filed Feb. 28, 2012, which in turn claims priority to French Patent Application No. 1151778, filed Mar. 4, 2011, the entire contents of all applications are incorporated herein by reference in their entireties.

TECHNICAL FIELD

The present invention relates to the general field of turbine engines. It relates more specifically to a method allowing rotational stall affecting a turbine engine compressor to be eliminated, as well as to a device to allow rotational stall in a turbine engine to be eliminated.

The invention applies to all types of turbine engines, and in particular to aeronautical turbine engines such as jet turbine engines, turboprop engines etc.

STATE OF THE PRIOR ART

Surge is a violent aerodynamic phenomenon which occurs in compressors. It involves an aerodynamic instability which gives rise to large longitudinal waves, which can reach a point where reversal of the flow direction in the compressor occurs. It is a phenomenon which can be destructive to compressor blades. Surge is characterised by the stalling of a large proportion of the compressor blades.

Rotational stall is also an aerodynamic instability which affects the compressor and which is characterised by the presence of one or more localised pockets of fluids (also called stall cells or pockets). It is propagated in the circumferential direction of the compressor, at a speed which is in general lower than the speed of rotation of the compressor. Rotational stall therefore corresponds to a partial stall of the compressor, which is characterised by a partial loss of performance, but which may be stable and which may be expressed as stagnation or reduction in engine speeds, as well as by large increases in the turbine discharge temperatures.

Rotational stall generally occurs in two situations:
during turbine engine start-up or re-ignition phases or
during a thrust regulation phase after start-up. In this case rotational stall generally occurs after a surge phase in the compressor.

Rotational stall is a stable phenomenon: in effect, once rotational stall occurs in a compressor it becomes established, even if the conditions required for rotational stall to occur are no longer present. Thus rotational stall does not generally disappear by itself. The phenomenon is persistent and if no attempts are made to eliminate it there is an inevitable risk of destruction of the turbine through overheating. In general it is the overheating alarm which leads pilots to become aware that rotational stall has occurred. Furthermore, in periods of high work-load for the crew delays in noticing the alarm has led to numerous turbines being destroyed.

Rotational stall detection warns the systems that the phenomenon has occurred. Document FR no. 1055559 describes a method for the detection of rotational stall in a turbine engine.

Currently, once rotational stall has been detected this rotational stall is eliminated in a turbine engine by shutting down then re-igniting the turbine engine, either manually or automatically. In most instances shutting down and then re-igniting the turbine engine causes the rotational stall to disappear, so that when the turbine engine is re-ignited the rotational stall has disappeared.

Nevertheless tests show a high level of engine restart failure.

SUMMARY OF THE INVENTION

The aim of the invention is to remedy the shortcomings of the current state of the art by proposing a method for effectively eliminating the rotational stall which occurs in the compressor of a turbine engine, by optimising the re-ignition of the turbine engine when the latter has been shut down following the detection of rotational stall.

Another purpose of the invention is to propose a method for the elimination of rotational stall which can be implemented by the control elements already present in a turbine engine.

In order to do this, according to a first aspect of the invention, a method is proposed for the elimination of rotational stall in a compressor of a turbine engine, characterised in that it includes the following steps:
A step for automatic detection of surge in the turbine engine;
A step for automatic shut-down of the turbine engine;
In the event of surge being detected, a step for automatic restoration of a surge margin;
A step for automatic re-ignition of the turbine machine;

The surge detection step allows the type of rotational stall to be determined, that is, rotational stall that has occurred as a result of surge or that which has occurred as a result of other causes, as explained previously. Thus rotational stall is not treated in the same way depending on whether it has occurred as a result of surge or otherwise. Detection of whether or not there has been surge in the turbine engine therefore allows the method for elimination of rotational stall to be adapted to the type of rotational stall that has occurred so that the rotational stall can be treated in the most effective manner. In effect, acting without distinguishing between the types of rotational stall compromises the re-ignition of the turbine engine: tests therefore show an almost systematic failure of re-ignition when rotational stall has occurred as the result of surge and when no margin restoration step has been carried out.

Thus when no surge has been detected, the method simply involves the steps for shut-down and re-ignition of the turbine engine.

On the other hand, when surge has been detected the method involves a surge margin restoration step. The act of restoring a surge margin to the compressor, more precisely of increasing the surge margin of the compressor, means that the conditions which led to the rotational stall occurring, that is to say, surge, can be prevented from re-occurring.

The jet turbine engine according to the invention may also exhibit one or more of the following characteristics, taken individually or according to all technically possible combinations.

Advantageously the shut-down step has a duration of between 0.5 seconds and 2 seconds, and preferably between 1 second and 1.5 seconds. The re-ignition step then takes place. Thus the method includes a micro shut-down step of the turbine engine. The act of shutting down the turbine engine for a period of the order of a second allows rotational stall to be eliminated in the majority of cases. Furthermore, the shutting-down of the machine can therefore be implemented by the components already present in the turbine engine. In effect the fuel taps present in the turbine engine are capable of carrying out a micro shut-down with a duration of between 0.5 and 2 seconds. On the other hand they cannot carry out micro shut-downs whose duration is much less than 0.5 seconds, so that if it is desired to carry out micro shut-downs of the order of milliseconds then the turbine engine must be equipped with special valves. Furthermore, a longer micro shut-down is not needed to eliminate rotational stall.

Advantageously the turbine engine includes a combustion chamber, where the combustion chamber is fed with fuel, where the shut-down step of the turbine engine includes a step for cutting off the fuel supply to the combustion chamber. In effect, one of the simplest means of stopping the turbine engine is to cut off the fuel supply to the combustion chamber. The turbine engine then stops and the rotational stall disappears.

Advantageously a fuel tap supplies fuel to the combustion chamber, with the step for cutting off the supply to the combustion chamber being a step involving closure of the fuel tap.

Advantageously the method includes a rotational stall detection step. This rotational stall detection step preferably takes place before any other step, and the turbine engine shut-down and re-ignition steps are preferably only implemented if rotational stall has been detected.

The method described in document FR no. 1055559 is preferably implemented in order to detect rotational stall.

In order to restore surge margin to the compressor, in the event of surge during engine start-up the level of the "ConP" coefficient reached during surge must not be reached again during the start-up which follows the rotational stall elimination then engine re-ignition phase, if further surge is to be prevented. The level of "ConP" is representative of the surge margin of high-pressure compressors.

The coefficient "ConP" is defined by the following formula:

$$ConP = \frac{WF32}{Ps32 \cdot (T25/288.15)^\theta}$$

Where:
WF32 is the flow rate of fuel injected into the combustion chamber;
Ps32 is the pressure in the combustion chamber;
T25 is the temperature at the inlet to the compressor;
And where θ is equal to 0.5.

The coefficient "ConP" is in general a function of the 'reduced' speed "Xn25r" of the compressor. The "Xn25r" 'reduced' speed is in effect defined by the following formula:

$$Xn25r = \frac{Xn25}{(T25/288.15)^\theta}$$

Where Xn25 is the spool speed of rotation of the high pressure body.

When rotational stall has occurred following surge, the level of the coefficient "ConP" at a given reduced speed "Xn25r" must be lowered in order to avoid further surge. Thus according to one embodiment, the surge margin restoration step includes a step for storing into memory the "ConP" level at a given 'reduced' speed "Xn25r" when surge has occurred, in order to lower the level of "ConP" at a lower 'reduced' speed "Xn25r" after the turbine engine re-ignition step.

In order to lower "ConP", a "ConP" equation is used which is a function of the 'reduced' speed "Xn25r". A reduction coefficient is applied to this equation around the level of "Xn25r" that is stored in memory during surge.

The lowering of "ConP" is then expressed as a reduction in the flow of fuel injected into the combustion chamber, optimised around the 'reduced' speed point that is critical in terms of surge. This prevents re-occurrence of surge and therefore the re-occurrence of rotational stall. The fuel flow control step may be achieved by controlling a fuel valve which allows the amount of fuel injected into the combustion chamber to be controlled.

Advantageously the lowering of "ConP" is achieved by successive reductions of the order of 3 to 5%. According to one embodiment the successive surges and stalls are therefore stored in memory in order to iteratively lower the level of "ConP" at a given 'reduced' speed "Xn25r".

Thus in order to restore surge margin to the compressor the amount of fuel injected into the combustion chamber in particular can be reduced. But more generally, the surge margin may be restored by controlling numerous parameters.

According to another embodiment, which can be combined with the previous one, the compressor includes at least one stator which has a variable pitch, with the step for restoring surge margin to the compressor including a step for modifying the stator pitch. In effect, modification of the pitch of the compressor stator allows the load applied to the compressor blades to be limited. This prevents surge and therefore rotational stall from re-occurring in the compressor.

According to another embodiment, which may be combined with the previous ones, the compressor is provided with a discharge valve which allows the amount of air in the compressor to be controlled, with the surge margin restoration step including a step for opening the discharge valve. In effect, reducing the amount of air in the compressor also allows the load exerted on the compressor blades to be limited, therefore reducing the risk of surge occurring in the compressor.

The step for restoration of surge margin to the compressor may be carried out between the turbine engine shut-down and re-ignition steps or after the turbine machine re-ignition steps.

Another aspect of the invention also concerns a device for eliminating rotational stall in a compressor of a turbine engine, characterised in that it includes:
Means of automatic detection of surge in the turbine engine;
Means of automatic shut-down of the turbine engine;
Means of automatic restoration of a surge margin;
Means of automatic re-ignition of the turbine engine.

Advantageously the turbine engine includes a combustion chamber, where the combustion chamber is supplied with fuel, where the means of shutting down the turbine engine include an element for cutting off the fuel flow into the combustion chamber. This element for cutting off the fuel flow may be, for example, a fuel tap.

Advantageously the elimination device in addition includes a regulation element suitable for regulating the fuel flow into the combustion chamber. This regulation element may be a fuel valve.

The element for cutting off the fuel and the element for regulating the fuel may be one and the same element or two distinct elements.

Another aspect of the invention concerns a turbine engine which includes a device according to the second aspect of the invention.

BRIEF DESCRIPTION OF DRAWINGS

Other characteristics and advantages of the invention will emerge on reading the detailed description which follows, with reference to the appended figures, which show.

For improved clarity, identical or similar elements are identified by the same reference signs in all figures.

DETAILED DESCRIPTION OF AT LEAST ONE EMBODIMENT

Rotational stalls may be classified into two categories: In effect there are first of all rotational stalls which appear during the ignition or re-ignition of the turbine engine. These rotational stalls occur as a result of incorrect ignition conditions such as, for example, when there are strong crosswinds or in unfavourable thermal conditions such as, for example, when the turbine engine is hot whilst the ambient air is cold. The external conditions which are favourable to ignition with rotational stall are not explicitly understood. Nevertheless the method described in document FR no. 1055559 may allow this type of rotational stall to be detected.

The second type of rotational stall corresponds to rotational stall which occurs as the result of surge. Surge is a consequence of a massive creation of stall conditions in the flow around the blading system of the compressor. The surge may disappear of its own accord in the event of the stall conditions in the flow around the compressor blades being removed, and it may not reappear. This is the case, for example, following the ingestion of a foreign object. Surge can also become rotational stall if a part of the blading system remains in stall conditions. The occurrence of these rotational stall events is therefore directly linked to surge phenomena and therefore to the surge margin of the compressor. This type of rotational stall can also be detected by the method described in document FR no. 1055559.

The method for eliminating rotational stall according to the invention allows both of these types of rotational stall to be eliminated.

Figure 1:
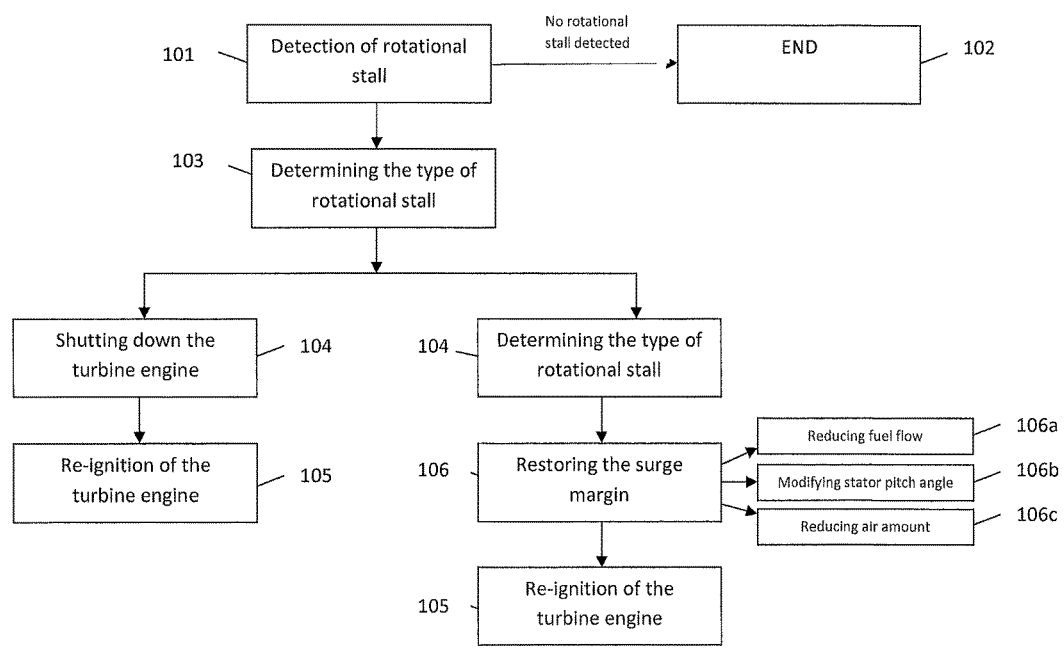
FIG. 1, a diagram which schematically represents the steps in a method according to the invention.

FIG. 1 shows the steps in this method which is implemented in a turbine engine which includes a low pressure compressor connected to a low pressure turbine through a low pressure shaft, a high pressure compressor connected to a high pressure turbine through a high-pressure shaft, and a combustion chamber.

The combustion chamber is supplied with fuel through a fuel tap.

The turbine engine is connected to a "Full Authority Digital Engine Control" (FADEC) system. The FADEC in particular allows the turbine engine to start-up automatically. In order to do this the FADEC can, in particular, open an element for cutting off the fuel flow, which is preferably a fuel tap. The FADEC can also control a fuel flow regulation element which allows the fuel flow supplying the combustion chamber to be regulated. This element for regulating the fuel flow is preferably a fuel valve.

The FADEC may also control shut-down of the combustion chamber by closing the element for cutting off the fuel flow.

With reference to FIG. 1, the method according to the invention first of all preferably includes a step 101 for detection of rotational stall. The method described in document FR no. 1055559 may be used in order to do this.

If no rotational stall is detected the method is terminated (step 102).

If rotational stall is detected the method then includes a step 103 for determining the type of rotational stall that has taken place.

If rotational stall of the first type is detected, that is, rotational stall which is not due to surge, the method includes a step 104 for shutting down the turbine engine then a step 105 for re-ignition of the turbine engine. Step 104 for shutting down the turbine engine is preferably a step involving actuating the element for cutting off the fuel flow into the combustion chamber, so as to cut off the flow of fuel reaching the combustion chamber. Step 105 for re-ignition of the turbine engine is preferably a step for automatically re-igniting the turbine engine by means of the FADEC. In order to do this the FADEC in particular re-opens the element for cutting off the fuel flow. The duration of the interruption is preferably of the order of a second, or a second and a half. In effect such a duration in the majority of cases allows the rotational stall to be eliminated.

Figure 2:
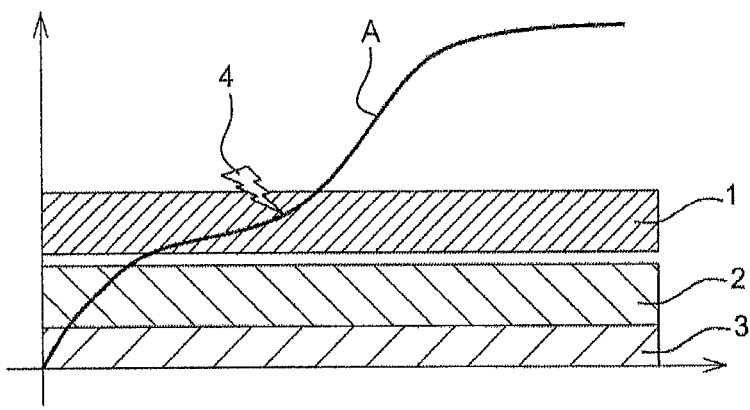
FIG. 2, a curve which represents the speed of rotation of the high-pressure body as a function of time during a normal ignition.

FIG. 2 represents the curve A of the change in speed of rotation of the high-pressure body, that is, of the high-pressure compressor rotor, of the high-pressure turbine rotor and of the high-pressure shaft, as a function of time during normal ignition. When curve A is in zone 1, ignition is possible without rotational stall. When curve A is in zone 2, ignition is possible but there is rotational stall. When curve A is in zone 3, ignition of the turbine engine is impossible. In the case shown in curve A, the turbine engine is ignited when the curve A reaches point 4. This point 4 is in zone 1, so that ignition takes place without any problems.

Figure 3:
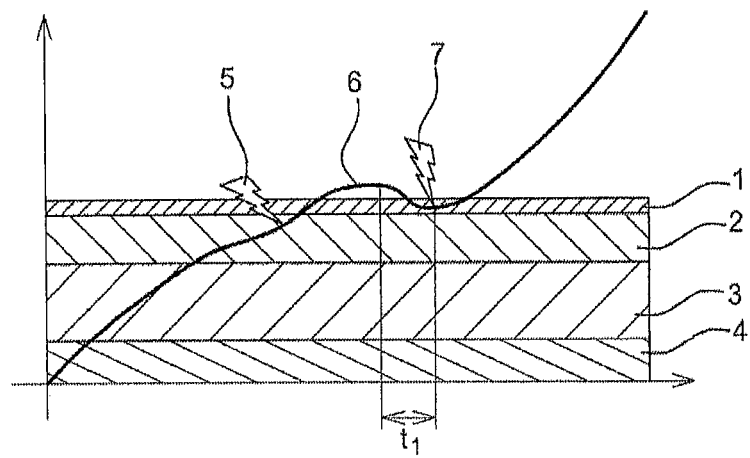
FIG. 3, a curve which represents the speed of rotation of the high-pressure body as a function of time during an ignition with rotational stall when a method according to the invention is implemented.

FIG. 3 represents the curve B of the change in the speed of rotation of the high pressure body as a function of time during ignition. When curve B is in zone 1, ignition is possible without rotational stall. When curve B is in zone 2, ignition is possible but there is rotational stall. In the case of FIG. 3 the zone wherein there is rotational stall is more extended, for example because there is a tailwind around the turbine machine. When curve B is in zone 3, ignition of the turbine engine is impossible. In the case shown in curve B, the turbine engine is ignited when the curve B reaches point 5. This point 5 is in zone 2, wherein there is ignition with rotational stall. At point 6 rotational stall is detected, with the result that the turbine engine is shut-down. The turbine engine is shut down for a period t1 which is preferably of the order of 1 second. As may be seen in FIG. 3, such a period t1 is sufficient for the speed of rotation of the high-pressure body to decrease in such a way that the curve B returns to the zone for start-up without rotational stall. The turbine machine is then re-ignited and in the majority of cases rotational stall does not re-occur.

If rotational stall of the second type is detected, that is, rotational stall which is due to surge, the method also includes a step 104 for shutting down the turbine engine. As in the previous case, step 104 for shutting down the turbine engine is preferably a step involving actuating the element for cutting off the fuel flow into the combustion chamber so as to cut off the flow of fuel reaching the combustion chamber. The method then includes a step 106 for restoring the surge margin of the compressor. In effect, the act of shutting down the turbine engine allows the rotational stall to be eliminated. Following this shut-down, re-ignition of the turbine engine is carried out. This automatic re-ignition is therefore started quickly following the cutting-off of the fuel. This re-ignition causes the turbine engine to re-ignite at a speed level greater than that during the initial ignition. The result of this is a normal re-ignition in many cases. On the other hand, even if the rotational stall disappears temporarily, since the rotational stall was due to surge, if the conditions under which the surge conditions appeared have not been eliminated then rotational stall will re-appear in the event of further surge. Surge margin is therefore restored to the compressor so that there is no further surge and so that there is no return to rotational stall. In order to prevent re-occurrence of rotational stall, the method therefore includes a step for increasing the surge margin of the turbine engine, which allows surge in the turbine engine to be eliminated.

In one embodiment, in order to prevent re-occurrence of surge the step 106 for restoring surge margin includes a step 110 for storing the parameter "ConP" at which the surge took place into memory, together with an equation for controlling the fuel flow arising from an equation involving "ConP". This equation is a function of the "Xn25r" 'reduced' speed. The method in addition includes a step 111 for lowering "ConP", by applying a reduction coefficient to this equation around the level of the "Xn25r" stored in memory during surge, as explained previously. The step 111 is advantageously carried out following step 105 for re-ignition of the turbine engine.

The lowering of the "ConP" is then expressed as a reduction in the flow of fuel injected into the combustion chamber, optimised around the low speed point that is critical in terms of surge. This prevents re-occurrence of surge and therefore re-occurrence of rotational stall. The fuel flow control step may be achieved by operating a fuel valve which allows the amount of fuel injected into the combustion chamber to be controlled.

In addition the localised application of the lowering of "ConP" prevents stagnations and shut-down of the turbomachine for speeds that are not critical in terms of surge.

According to one embodiment, the step for lowering "ConP" is carried out iteratively in the case of the surge re-occurring. In effect, too lowering the "ConP" too much can cause stagnation or even shut-down of the turbine engine: the turbine engine could stagnate and no longer be capable of accelerating or of being re-ignited. This is why it is important to proceed using iterative reductions: first of all a first reduction coefficient is applied to the "ConP" equation (for example 0.95, which corresponds to a 5% lowering of the "ConP"). The engine is then re-ignited and start-up allowed continuing. In the event of rotational stall re-occurring following surge, a second reduction coefficient (for example 0.9, which corresponds to 10% lowering of "CsonP") is applied then another start-up attempt is made following the micro shut-down, and so on until a maximum lowering of "ConP" threshold is reached. Once this threshold is reached re-starting is considered to be impossible and an alarm is sent to the pilot.

According to another embodiment, if the turbine engine is controlled in a closed loop by corrective networks using "dXn25/dt", also called turbine engine spool rate control loops, which are functions of the parameter "Xn25r", the reduction coefficient is then applied to the "dXn25/dt" setting. In effect the spool rate dXn25/dt is itself also a representative parameter of the compressor surge margin. By limiting the spool rate of the engine, the parameter "ConP" at a given low speed "Xn25r" is naturally lowered.

Steps 110 and 111 for storage into memory and for lowering ConP allow the surge margin of the turbine engine to be increased, which eliminates surge in the turbine engine whilst minimising the risk of stagnation or of shut-down of the turbine engine.

In order to restore surge margin to the compressor, the method may include one or more of the following steps:

The method can first of all include a step 106a for reducing the flow of fuel into the combustion chamber. In order to do this, the FADEC preferably controls the element for regulating the fuel flow so as to reduce the flow of fuel into the combustion chamber. The element for regulating the flow of fuel can also be controlled by control means other than the FADEC;

The method can also include a step 106b for modifying the pitch angle of the high-pressure compressor stator. In order to do this the high-pressure compressor must include a stator which has blades whose pitch is variable. The act of modifying the pitch angle of the high-pressure blades allows the load on the high-pressure compressor to be reduced and the surge margin of the turbine engine therefore to be increased. The pitch angle of the stator may be modified by the FADEC or by other means of control. In one embodiment, the step 106b for modifying the pitch angle is carried out in an iterative manner in the event of surge re-occurring. Advantageously the step 106b for modification of the stator pitch angle is carried out by successive modifications of the order of 1% to 2% of closure of the nominal pitch angle.

The method can also include a step 106c for reducing the amount of air in the high-pressure compressor, which allows the load on the high-pressure compressor to the reduced and thus allows the surge margin to be increased.

In order to do this the high-pressure compressor is preferably provided with a discharge valve which allows the amount of air in the high-pressure compressor to be controlled. Step 106c for restoring surge margin therefore includes a step for opening the discharge valve.

Naturally the invention is not restricted to the embodiments described with reference to the figures and alternatives may be envisaged without leaving the context of the invention. The method may thus be implemented by control devices other than the FADEC.

The invention claimed is:

1. A method for eliminating rotational stall in a compressor of a turbine engine, comprising:
   automatically detecting a rotational stall in the turbine engine;
   identifying a type of a detected rotational stall;
   automatically shutting down the turbine engine;
   in response to the detected rotational stall being identified as a surge-related type rotational stall, automatically restoring a surge margin of the compressor; and
   automatically re-igniting the turbine engine.

2. The method according to claim 1, wherein the turbine engine includes a combustion chamber, wherein the combustion chamber is fed with fuel, and wherein the shut-down of the turbine engine includes cutting off a fuel supply to the combustion chamber.

3. The method according to claim 2, wherein a fuel tap allows fuel to be supplied to the combustion chamber, and wherein cutting off the fuel supply to the combustion chamber includes closing the fuel tap.

4. The method according to claim 2, wherein the restoring of the surge margin includes reducing a flow rate of fuel into the combustion chamber relative to the flow rate of fuel into the combustion chamber prior to the shutdown of the turbine engine.

5. The method according to claim 1, wherein an identified type of rotational stall includes a non-surge related type rotational stall and the surge-related type rotational stall.

6. The method according to claim 1, wherein the restoring of the surge margin includes storing in memory a parameter which is representative of the surge margin.

7. The method according to claim 6, comprising decreasing the parameter.

8. The method according to claim 1, wherein the compressor includes at least one stator with a variable pitch angle, and wherein the restoring of the surge margin includes modifying the variable pitch angle of the at least one stator.

9. The method according to claim 1, wherein the compressor is provided with a discharge valve which allows an amount of air in the compressor to be controlled, and wherein the restoring of the surge margin includes opening the discharge valve.

* * * * *